US009651401B2

(12) United States Patent
Kohler

(10) Patent No.: US 9,651,401 B2
(45) Date of Patent: May 16, 2017

(54) INDUCTIVE SENSOR

(75) Inventor: Armin Kohler, Lampertheim (DE)

(73) Assignee: Rechner Industrie-Elektronik GmbH, Lampertheim (DE)

( * ) Notice: Subject to any disclaimer, the term of this patent is extended or adjusted under 35 U.S.C. 154(b) by 871 days.

(21) Appl. No.: 12/997,708

(22) PCT Filed: Jun. 26, 2009

(86) PCT No.: PCT/EP2009/004643
§ 371 (c)(1),
(2), (4) Date: Mar. 10, 2011

(87) PCT Pub. No.: WO2009/156176
PCT Pub. Date: Dec. 30, 2009

(65) Prior Publication Data
US 2011/0169508 A1 Jul. 14, 2011

(30) Foreign Application Priority Data

Jun. 27, 2008 (DE) .................. 10 2008 030 064
Jul. 15, 2008 (DE) .................. 10 2008 033 090

(51) Int. Cl.
*G01N 27/00* (2006.01)
*G01D 5/20* (2006.01)
*G01D 5/243* (2006.01)

(52) U.S. Cl.
CPC .......... *G01D 5/2006* (2013.01); *G01D 5/243* (2013.01)

(58) Field of Classification Search
USPC ....................................... 324/654
See application file for complete search history.

(56) References Cited

U.S. PATENT DOCUMENTS 4,404,860 A * 9/1983 Wood ............... G01P 5/07
73/861.78
4,678,992 A 7/1987 Hametta
4,725,777 A 2/1988 Tousch
(Continued)

FOREIGN PATENT DOCUMENTS

CN 201222081 Y * 4/2009
DE 3235016 A1 3/1984
(Continued)

OTHER PUBLICATIONS

Oesterle, Ulrich, "DE Application No. 10 2008 033 090.6 Office Action Feb. 29, 2012", , Publisher: DPMA, Published in: DE, Google Machine Translation.
Prufungsstelle Fur Klasse, "German Patent Application No. 10 2008 033 090.6 Office Action", Aug. 17, 2012, Publisher: DPMA, Published in: DE, (Google Machine Translation.
"International Search Report and Written Opinion from International Application No. PCT/EP2009/004643 dated Dec. 23, 2009", , Publisher: European Patent Office, Published in: DE, Google Machine Translation.

*Primary Examiner* — Vincent Q Nguyen
(74) *Attorney, Agent, or Firm* — Kaplan Breyer Schwarz & Ottesen, LLP

(57) ABSTRACT

A sensor and a method for detecting objects using an inductive sensor. An electrical alternating field is generated by using an oscillating circuit, wherein the amplitude and/or frequency of a signal of the oscillating circuit changes when an object is present. The signal of the oscillating circuit is rectified. The rectified signal is relayed to a high-pass filter, wherein damping of the oscillating circuit caused by non-moving objects is filtered by the high-pass filter. The signal is compared with a threshold value, and an output signal is generated when the signal value is above or below the threshold value.

14 Claims, 4 Drawing Sheets

(56) References Cited

U.S. PATENT DOCUMENTS

| | | | |
|---|---|---|---|
| 5,025,227 A * | 6/1991 | Walton | G01V 3/102 |
| | | | 331/18 |
| 5,144,231 A * | 9/1992 | Tenenbaum et al. | 324/164 |
| 6,737,981 B2 * | 5/2004 | Hagemeister et al. | 340/679 |
| 2002/0084782 A1* | 7/2002 | Guthrie | 324/307 |
| 2003/0090266 A1* | 5/2003 | Kesil | G01B 7/082 |
| | | | 324/230 |
| 2005/0062484 A1* | 3/2005 | Reining | G01V 3/101 |
| | | | 324/655 |
| 2006/0061351 A1* | 3/2006 | Chen et al. | 324/139 |
| 2007/0268014 A1* | 11/2007 | Shimomura et al. | 324/207.16 |
| 2008/0079420 A1 | 4/2008 | Hrubes et al. | |
| 2008/0303517 A1* | 12/2008 | Skultety-Betz | G01V 3/104 |
| | | | 324/234 |
| 2010/0164512 A1* | 7/2010 | Kiss et al. | 324/630 |
| 2010/0219840 A1* | 9/2010 | Motojima et al. | 324/633 |

FOREIGN PATENT DOCUMENTS

| | | |
|---|---|---|
| DE | 4141264 C1 | 3/1993 |
| DE | 4142680 A1 | 7/1993 |
| DE | 4228888 A1 | 3/1994 |
| DE | 4240739 A1 | 3/1994 |
| DE | 198 03 187 A1 | 7/1999 |
| DE | 10143900 A1 | 3/2003 |
| DE | 19903750 C2 | 7/2003 |
| DE | 19641392 B4 | 7/2008 |
| GB | 2 435 518 A | 8/2007 |

* cited by examiner

INDUCTIVE SENSOR

FIELD OF THE INVENTION

The invention relates to an inductive sensor, and a method for detecting objects using an inductive sensor.

BACKGROUND OF THE INVENTION

Inductive sensors are known. An inductive sensor is described in German Unexamined Patent Application DE 42 28 888 A1, for example. Conventional inductive sensors are used for detecting rotational speeds, for example. An inductive sensor cooperates with a magnet. A voltage is induced in a coil due to change in the magnetic field caused by a magnet moving past. A rotational speed signal, for example, may be picked up in this manner.

Another option is to provide a magnet in the sensor itself, the magnet cooperating with ferromagnetic components. A ferromagnetic object may thus likewise be detected via a change in the magnetic field.

Inductive sensors are also known from practice which react to metals of any type, and generate a signal when a metallic body is in the vicinity of the sensor.

One disadvantage, among others, of such known inductive sensors is that a switching signal is generated in the mere presence of a metallic component. Therefore, such sensors have only limited suitability for detecting dynamic processes. In addition, known inductive sensors are relatively sensitive to interferences. Thus, for example, metal dust or shavings, etc. adhering to the sensor may result in an erroneous detection.

OBJECT OF THE INVENTION

Accordingly, the object of the invention is to at least reduce the referenced disadvantages of the prior art.

It is an object of the invention in particular to provide a sensor in which the detection of dynamic processes is improved. Thus, a particular aim is to reduce interferences caused by static components or other metal parts in the vicinity of the sensor.

A further object of the invention is to provide a particularly simple sensor which is also sensitive to relatively small objects.

A further object of the invention is to provide a sensor which reacts to any type of metallic object, and which, for example, may be easily exchanged with known inductive sensors which operate on a ferromagnetic principle.

A further object of the invention is to provide a sensor which detects dynamic processes independently of direction, and which may be mounted from the outside, i.e., which does not require that objects for detection must be led through the interior of a coil.

SUMMARY OF THE INVENTION

The invention relates, in the first place, to an inductive sensor which includes an oscillating circuit having a coil. When a metallic object approaches, the field lines and therefore the inductance of the system change. The oscillating circuit is thus detuned, which results in a change, in particular a decrease, in the amplitude or the frequency of the signal of the oscillating circuit. Conclusions may thus be drawn concerning the presence of an object in the detection range of the sensor, and an output signal may be generated.

According to the invention, the sensor has means for suppressing changes in the amplitude of a signal of the oscillating circuit caused by static objects.

Changes in the amplitude of the oscillating circuit caused by static components may thus be masked during operation of the sensor, thus avoiding, among other things, interference from metallic components present in the vicinity. In addition, for detection of rotational speed, for example, it is ensured that the sensor does not emit an output signal when, for example, the tooth of a pinion is stopped in the detection range of the sensor.

Thus, the sensor emits a signal only when an object moves past the sensor, but not when a stationary object is present in the detection range.

In one preferred embodiment of the invention, the sensor has a rectifier for rectifying the signal of the oscillating circuit. The rectification of the signal results in improved processability.

It is understood that "rectification" does not refer to a sinusoidal signal, for example, or that the signal is completely uniform at constant amplitude. Rather, "rectification" also refers to smoothing of the signal.

In one preferred embodiment of the invention, the sensor has a threshold value comparator.

It is provided in particular that a rectified signal is further processed using a threshold value comparator, and conclusions are thus drawn concerning the presence of a moving object.

In one preferred embodiment of the invention, the threshold value and/or the oscillator current is/are adjusted or modified, thus allowing the sensing distance to be easily set. The oscillator current is preferably set in such a way that a higher resolution of the sensor generally results.

An output signal is preferably generated via an output stage when the signal value is below or above the threshold value.

In one refinement of the invention, the sensor has means for readjusting the amplitude and/or frequency of the oscillating circuit to a predefined setpoint value for static damping.

It is provided in particular that the amplitude and/or frequency of the oscillating circuit is regulated with respect to a predefined setpoint value over a fairly long detection period. This avoids, for example, further reduction in the amplitude when metallic objects deposit in the detection range of the sensor, which could result in impaired sensitivity, or even failure, of the sensor. Such regulation may be carried out, for example, by detecting via a circuit the amplitude over a specified, fairly long period of time, for example at least one minute, when the amplitude is less than a predefined setpoint value over this fairly long period of time; for example, the capacitance of a capacitor of the oscillating circuit is modified in such a way that the amplitude increases once again.

The inductive sensor is preferably designed for continuous measurement.

The resolution of the sensor is therefore essentially determined by the frequency of the oscillating circuit. In one preferred embodiment of the invention, the undamped oscillating circuit has a frequency of 10 kHz to 1000 kHz, preferably 300 kHz to 700 kHz. The sensor is therefore suitable for successively detecting objects at relatively short intervals.

The means for suppressing changes in the amplitude of the signal of the oscillating circuit caused by static objects preferably include at least one capacitor. This design allows a particularly simple circuit. Alternatively, electronic filtering, also using a microcontroller, for example, may be carried out.

In one preferred embodiment of the invention, the capacitor forms a high-pass filter to which the rectified signal of the oscillating circuit is relayed.

An object moving past causes a change in amplitude of the oscillating circuit, and therefore also in the magnitude of the rectified signal. Using a capacitor, it is possible to mask, for example, frequencies of less than 0.5 Hz, preferably less than 1 Hz, and particularly preferably less than 2 Hz, in a particularly simple manner.

Thus, the signal passes into a threshold value comparator for further processing only when a dynamic process is involved.

The sensor is preferably designed in such a way that the detection range is located outside the coil.

It is provided in particular that a coil is installed in a sensor housing having an essentially cylindrical design, the detection range being located in the front region, outside the sensor housing.

Such a sensor may be installed from the outside in a particularly simple manner, and is therefore particularly suited for exchanging with known inductive sensors which operate according to any previously known principle.

The coil axis is preferably situated on a center axis of the cylindrical sensor housing.

In one refinement of the invention, the sensor or the sensor housing has a thread for easily screwing on.

In one preferred embodiment of the invention, all electronic components necessary for operation of the sensor are situated in the sensor housing, in particular on a printed circuit board, which, viewed outwardly from the detection range, is located behind the coil.

The invention further relates to a method for detecting objects using an inductive sensor.

An electrical or magnetic field is generated using an oscillating circuit. The oscillating circuit is detuned by metallic objects in the detection range, thus changing the amplitude or frequency of the oscillating circuit.

The signal of the oscillating circuit is rectified and relayed to a high-pass filter.

Thus, the signal passes through the high-pass filter only when the signal changes in a predefined minimum frequency.

Only signals which reflect a dynamic process reach a threshold value comparator.

By means of the threshold value comparator, an output signal is generated in a known manner, for example via an output stage, when the signal value is below or above the threshold value.

The static portions of the signal of the oscillating circuit are preferably filtered out using at least one capacitor and/or microcontroller.

BRIEF DESCRIPTION OF THE DRAWINGS

The invention is explained in greater detail below with reference to the drawings in FIGS. 1 through 5.

DETAILED DESCRIPTION

Figure 1:
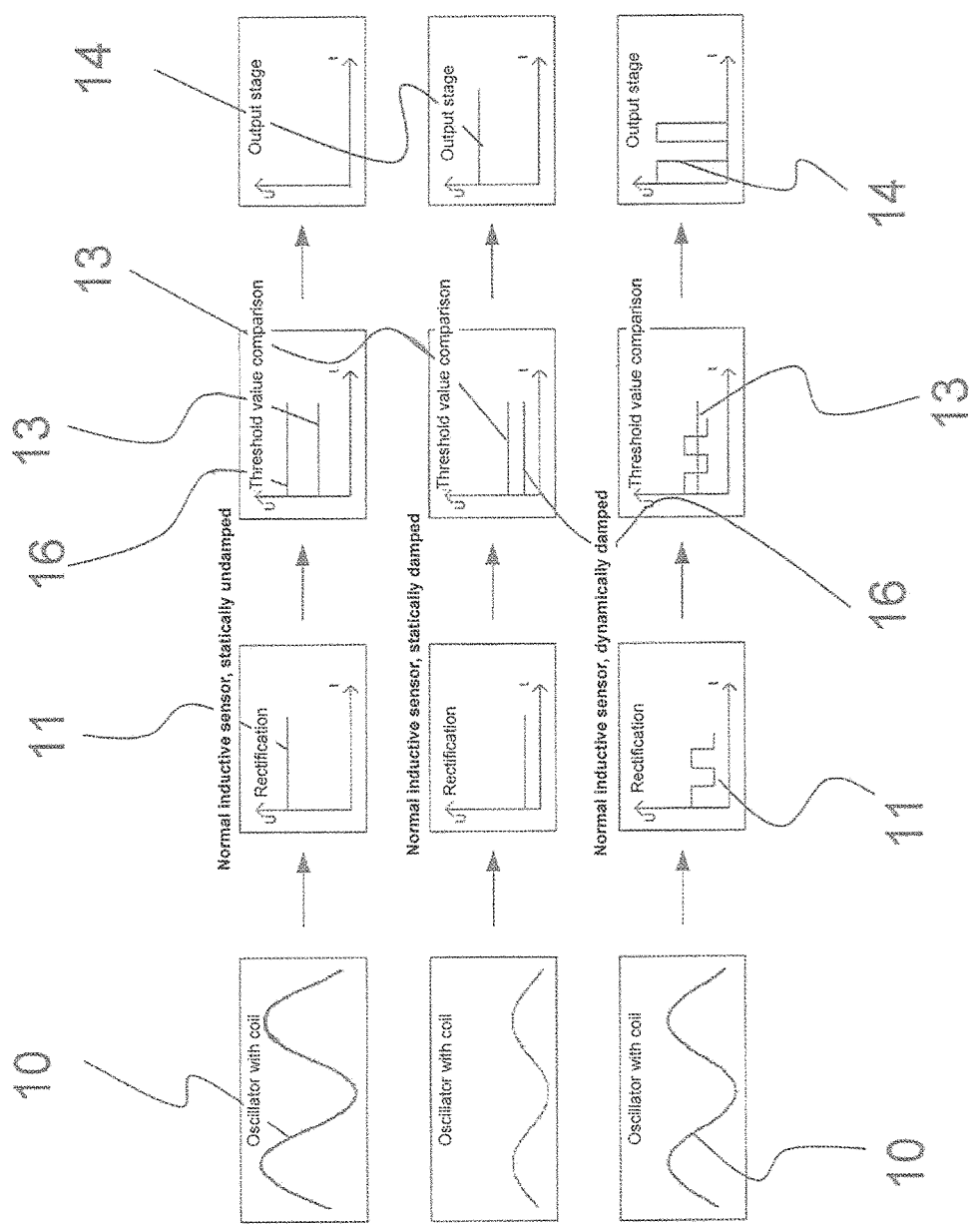
FIG. 1 schematically shows the principle of known inductive sensors.

FIG. 1 schematically illustrates the function of an inductive sensor which also detects static processes. The statically undamped, statically damped, and dynamically damped states are illustrated for comparison.

The first column illustrates the respective signal of the oscillating circuit 10.

In the top row the inductive sensor is statically undamped, and the signal of the oscillating circuit 10 is at a maximum value.

The signal of the oscillating circuit 10 is converted to a rectified signal 11 and relayed to a threshold value comparator. The signal 16 present at the threshold value comparator thus corresponds to the rectified signal 11.

In the first row, third column, the rectified signal 16 which has been relayed to the threshold [value] comparator is above the set threshold value 13. The sensor is designed in such a way that an output signal is generated only when the signal value is below the threshold value 13. Accordingly, as shown in the top row at the far right, for an undamped sensor no output signal is emitted by the output stage.

The second row shows a statically damped sensor. As a result of the detuning of the oscillating circuit, the amplitude in the first column, second row is less than in the first row.

It is apparent that the rectified signal 11 is also lower than in the first row.

For the threshold value comparator, the rectified signal 16 present at the threshold [value] comparator is lower than the threshold value 13.

The output stage accordingly emits an output signal 14.

The sensor then delivers an output signal, although only one stationary component is present in the detection range. This may, for example, easily result in interferences, for example because the metallic components are too close to the sensor. For example, in certain applications it is no longer possible to detect the rotational speed due to the fact that the sensor continuously delivers an output signal.

The dynamic damping of the sensor is illustrated in the third row. For a dynamic change, the amplitude of the signal of the oscillating circuit 10 continuously changes as the metallic object passes through the detection range of the sensor.

Accordingly, the amplitude of the rectified signal 11 also changes. In the idealized form shown here, this is illustrated as a square wave signal.

The rectified signal 16 present at the threshold value comparator is then periodically below the threshold value 13, and the output stage therefore emits a periodic output signal 14.

The basic principle of the invention is explained with reference to FIG. 2. Corresponding to the illustration in FIG. 1, the three states statically undamped, statically damped, and dynamically damped are shown in rows one beneath the other.

The first row essentially corresponds to a conventional sensor. The rectified signal 16 present at the threshold value comparator is already above the threshold value 13, so that the output stage emits no output signal.

As previously illustrated in FIG. 1, for a statically damped sensor the amplitude of the signal of the oscillating circuit 10 is lower, so that the rectified signal 11 also has a lower value. As the result of dynamic recognition 15, for example in the form of a high-pass filter which allows the rectified signal to pass through only when it changes at a predefined frequency, the rectified signal 11 is blocked in such a way that the signal 16 present at the threshold value comparator essentially corresponds to the signal of the undamped sensor. Accordingly, in the second row the rectified signal 16 in the threshold value comparator is above the threshold value 13, so that the output stage emits no output signal.

The accuracy of the sensor may thus be greatly improved, and in particular it is possible to set the sensing distance more precisely.

The dynamic damping illustrated in row 3 once again essentially corresponds to the illustration in FIG. 1. The value of the rectified signal 11 varies, as the result of which the filter for static processes, in the present case referred to as dynamic recognition 15 and which is preferably designed as a high-pass filter, allows the signal 11 to pass through. The signal 16 present at the threshold value comparator is then periodically below the threshold value, and the output stage emits a periodic output signal 14.

Figure 2:
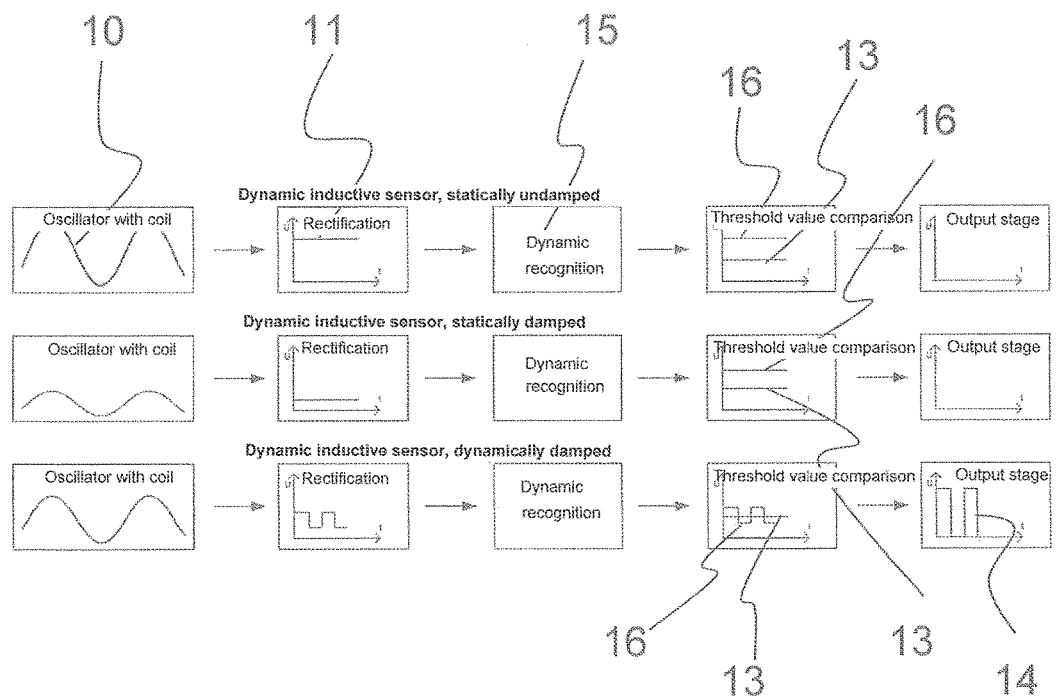
FIGS. 2 and 2a schematically show in greater detail the principle of a sensor according to the invention which detects only dynamic processes.
Figure 2A:
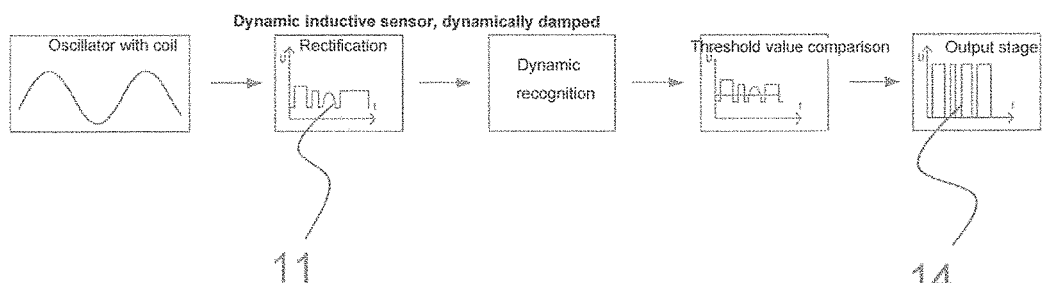

FIG. 2*a*, similar to FIG. 2, shows a sensor according to the invention which is dynamically damped; in this illustration an irregular rectified signal 11 is present due to objects moving past at various speeds.

The processing takes place analogously to FIG. 2.

It is apparent from this illustration that the output signal 14 has a pulse width which is limited by the high-pass filter or the means for suppressing the changes in the amplitude and/or frequency caused by static objects.

If a moving object to be detected passes into the detection range of the sensor, provided that the object moves past over a fairly long period of time, only the entry of the object into the detection range is detected, since further damping is likewise suppressed by the high-pass filter. The pulse width is therefore limited.

Figure 3:
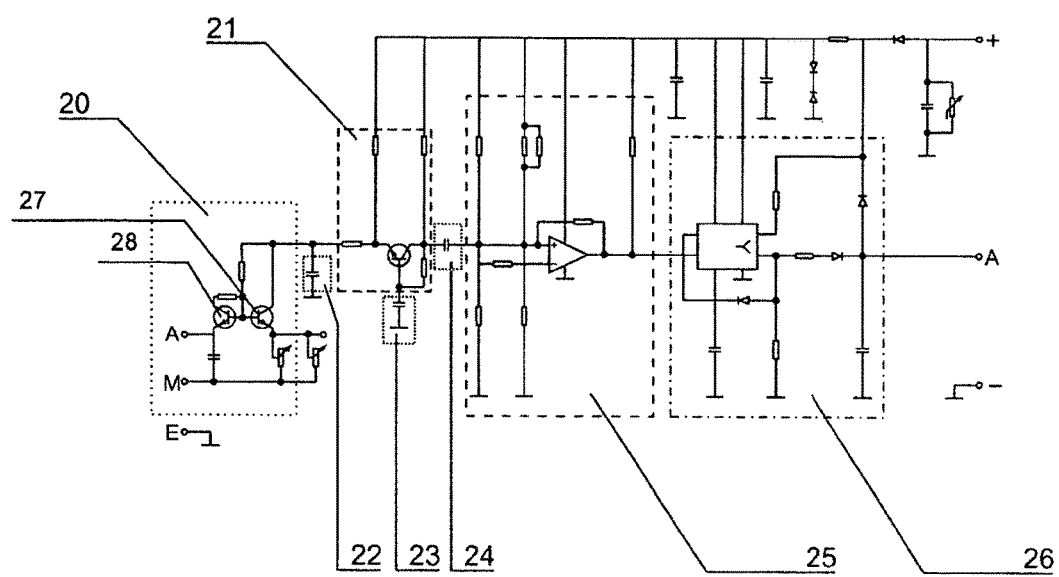
FIG. 3 shows an example of a wiring diagram of a sensor according to the invention.

FIG. 3 schematically shows a wiring diagram of a sensor according to the invention. The important functional components of the switching circuit are divided into groups for purposes of explanation.

The switching circuit includes an oscillating circuit 20 which is connected to a coil and which supplies a preferably sinusoidal output signal. If a metallic object (not illustrated) approaches, the oscillating circuit 20 is detuned, thus reducing the amplitude of the signal, which is relayed to a rectifier 21.

The oscillating circuit includes the two transistors 27 and 28, which are used to avoid sensitivity to temperature. The connections to the coil are denoted by reference characters A and M.

In this exemplary embodiment, the rectifier 21 is designed as a filter circuit having capacitors 22 and 23, so that the signal does not undergo ideal rectification and instead is merely smoothed.

The signal rectified in this manner is relayed via a capacitor 24 to a threshold value comparator 25.

The capacitor 24 acts as a high-pass filter, so that a modified signal is present at the threshold value comparator 25 only when the magnitude of the rectified signal changes at a minimum frequency. Static damping of the sensor is suppressed in this manner.

When the signal value is below a threshold value, the threshold value comparator 25 relays the signal to an output stage 26, which emits an appropriate output signal.

The design of a sensor is explained in greater detail with reference to FIGS. 4 and 5.

Figure 4:
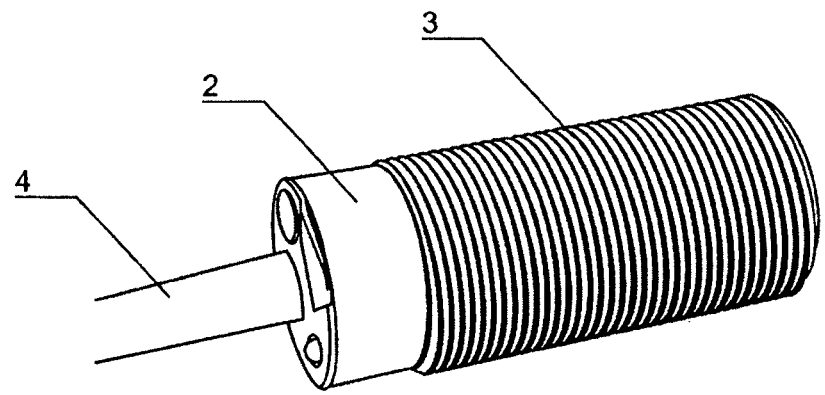
FIGS. 4 and 5 show an inductive sensor.

As illustrated in FIG. 4, the inductive sensor 1 includes a housing 2 having a thread 3. The inductive sensor 1 may thus be easily mounted from the outside at a suitable location, and is particularly suited for exchanging with known inductive sensors based on the magnetic principle. The sensor 1 includes a connecting line 4 by means of which the sensing distance may also be adjusted.

Figure 5:
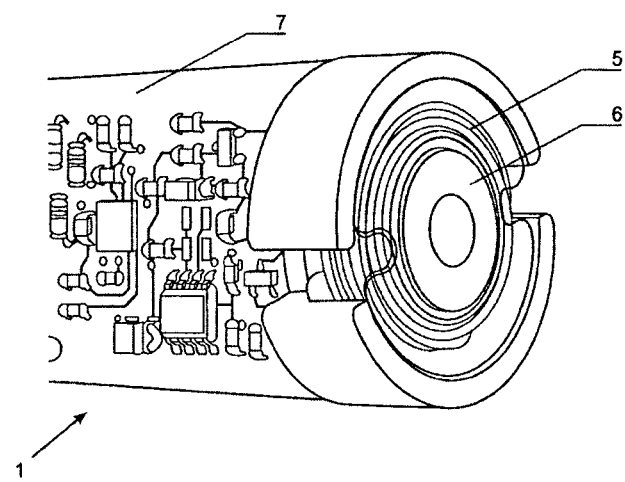

FIG. 5 shows an inductive sensor 1 according to the invention, with the housing open.

A coil 5 having a ferrite core 6 is present in the front region of the sensor. The detection range is therefore at the front, outside the coil 5. The plane defined by the coil 5 is essentially perpendicular to the axis of the sensor 1.

A printed circuit board 7 on which the sensor electronics system is situated is located behind the coil 5.

The sensor according to the invention is particularly suited for improved recognition of rather small moving masses, is independent of direction, and may be mounted from the outside.

It is understood that the invention is not limited to a combination of the features described above, but, rather, that all features may be combined by one skilled in the art if this is expedient.

LIST OF REFERENCE NUMERALS

1 Inductive sensor
2 Housing
3 Thread
4 Connecting line
5 Coil
6 Ferrite core
7 Printed circuit board
10 Signal of the oscillating circuit
11 Rectified signal
13 Threshold value
14 Output signal
15 Dynamic recognition
16 Signal present at the threshold value comparator
20 Oscillating circuit
21 Rectifier
22 Capacitor
23 Capacitor
24 Capacitor
25 Threshold value comparator
26 Output stage
27 Transistor
28 Transistor

What is claimed is:

1. An inductive sensor that detects an approaching metallic object including:
    an oscillating circuit having a coil, wherein the amplitude and/or frequency of a signal of the oscillating circuit changes when the metallic object is present in the vicinity of the coil, and an output signal is generated thereby;
    a rectifier for rectifying the signal of the oscillating circuit;
    a threshold value comparator that is arranged after the rectifier; and
    a high-pass filter which is arranged between the rectifier and the threshold value comparator and which filters frequency components produced by the oscillating circuit caused by a nonmoving metallic, so that changes in the amplitude and/or frequency of the signal of the oscillating circuit caused by a static metallic object, which is present in a detection range, are suppressed.

2. The inductive sensor according to claim 1, wherein the inductive sensor generates the output signal when the difference of a signal with respect to a threshold value changes.

3. The inductive sensor according to claim 1, wherein the inductive sensor readjusts the amplitude and/or frequency of the oscillating circuit to a predefined setpoint value for static damping.

4. The inductive sensor according to claim 1, wherein the inductive sensor is designed for continuous measurement.

5. The inductive sensor according to claim 1, wherein the oscillating circuit when undamped has a frequency of 10 kHz to 1000 kHz.

6. The inductive sensor according to claim 1, further comprising at least one capacitor that is arranged after the rectifier so that changes in the amplitude and/or frequency of a signal of the oscillating circuit caused by static objects are suppressed.

7. The inductive sensor according to claim 1, wherein the detection range of the inductive sensor includes a space outside the coil.

8. The inductive sensor according to claim 1, wherein the inductive sensor has a substantially cylindrical design, the coil being situated in a front region of the inductive sensor.

9. The inductive sensor according to claim 8, wherein the plane defined by the coil is transverse to the center axis of the cylindrical inductive sensor.

10. The inductive sensor according to claim 8, wherein the plane defined by the coil is substantially perpendicular to the center axis of the cylindrical inductive sensor.

11. The inductive sensor according to claim 1, wherein the inductive sensor has a thread for screwing in.

12. The inductive sensor according to claim 1, wherein the oscillating circuit when undamped has a frequency of 300 kHz to 700 kHz.

13. A method for detecting an approaching metallic object using an inductive sensor, comprising:
    generating an electrical alternating field using an oscillating circuit, wherein the amplitude and/or frequency of a signal of the oscillating circuit changes when the metallic object is present;
    rectifying the signal of the oscillating circuit;
    relaying the rectified signal to a high-pass filter, wherein frequency components produced by the oscillating circuit caused by a nonmoving metallic object in a detection range are filtered by the high-pass filter;
    comparing the signal to a threshold value; and
    generating an output signal when the signal value is above or below the threshold value.

14. The method for detecting objects using an inductive sensor according to claim 13, wherein static portions of the oscillating circuit are filtered out using a capacitor or microcontroller.

* * * * *